United States Patent Office 3,476,388
Patented Nov. 4, 1969

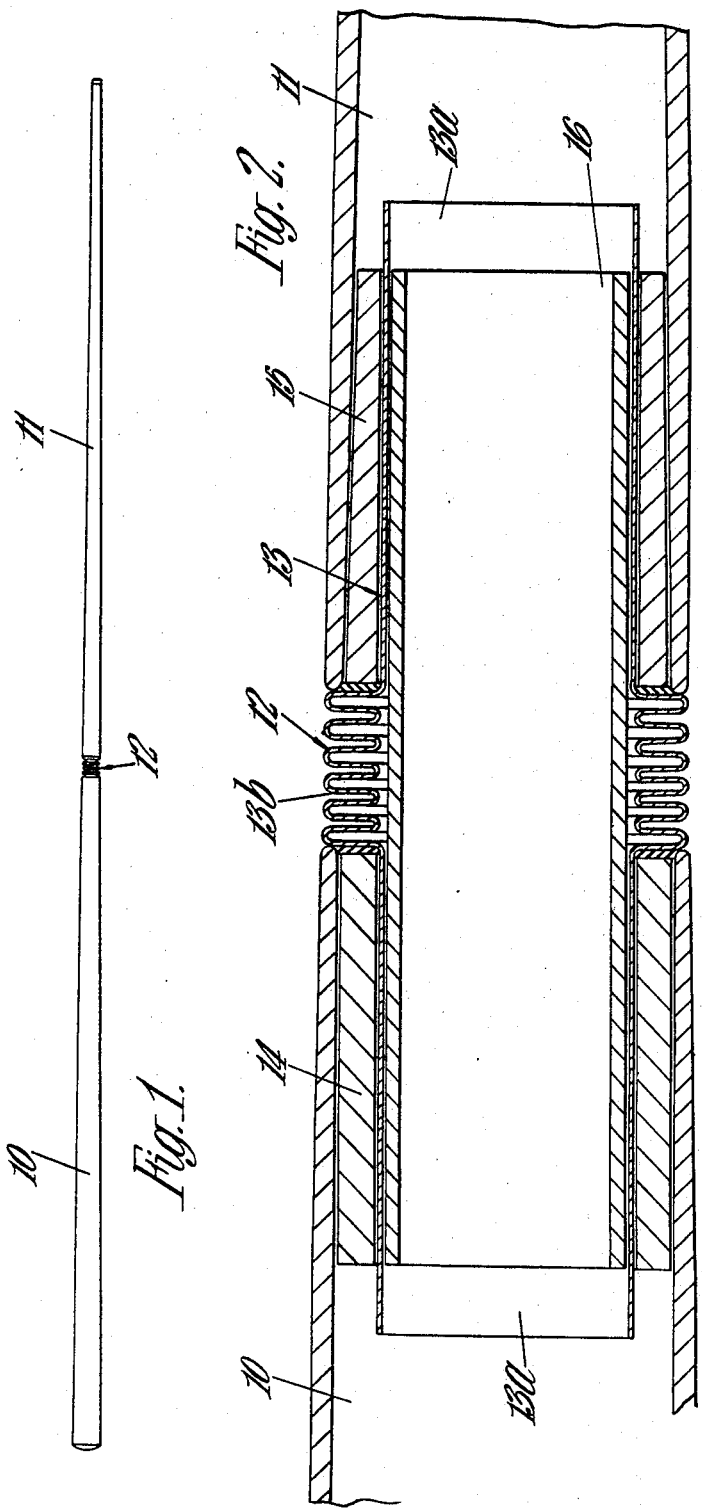

3,476,388
BILLIARD CUES
Leslie Charles Hackett, Clent, England, assignor to Accles & Pollock Limited, Oldbury, Birmingham, England, a British company
Filed Feb. 28, 1967, Ser. No. 619,327
Claims priority, application Great Britain, Mar. 1, 1966, 8,844/66
Int. Cl. A63d 15/08
U.S. Cl. 273—68
3 Claims

ABSTRACT OF THE DISCLOSURE

A tapered metal billiard cue is divided into two sections which are joined together by a resilient joint which includes a metal bellows with convolutions interposed between the ends of the two cue sections. The bellows is secured into place by means of a flexible adhesive which permits movement between the cue sections, such movement being opposed by the bellows.

---

This invention relates to billiard cues of the type formed from a tapered metal tube and has as an object to provide such a cue in a convenient form. It is to be understood that the term "billiard cue" is used herein to denote a cue for playing billiards, snooker, pool and other similar games.

A billiard cue in accordance with the invention comprises a pair of tubular metal sections joined together in end to end relationship by a resilient joint means incorporating a metal spring member and adapted to permit slight relative longitudinal movement of the sections.

Reference is now made to the accompanying drawings in which:

FIGURE 1 is an elevational view of a cue in accordance with the invention, and

FIGURE 2 is a fragmentary cross-sectional view on an enlarged scale of a joint in the tube.

As shown in FIGURE 1, the tube is of tapering form and consists of a butt section 10 and a tip section 11. A resilient joint means 12 interconnects the sections 10 and 11 in end to end relationship.

As shown in FIGURE 2 the resilient joint means incorporates a resilient metal spring member in the form of a tubular resilient bellows 13. The bellows consists of a pair of plane tubular end sections 13a interconnected by a convoluted intermediate section 13b. The convoluted section 13b is formed by a known process and it will be seen that the spaces between the convolutions in the exterior surface of the bellows are greater than those between the convolutions in the interior surface of the bellows.

The tubular end portions 13a of the bellows 13 are secured by means of a thin film of an epoxy resin to a pair of external mounting bushings 14, 15 respectively. The bushing 14 is of constant external and internal diameter, whereas the bushing 13 is of constant internal diameter along its length but of externally tapering form. Secured within the two tubular end portions 13a of the bellows 13 is a reinforcing sleeve 16 having an external diameter only slightly less than the internal diameters of the tubular end portions 13a and is secured thereto by a further thin film of an epoxy resin adhesive.

The cue is manufactured by taking a length of tapered metal tubing and cutting it into the two sections 10, 11 at a position where the external diameter of the tube is equal to or slightly greater than the maximum external diameter of the convoluted portion 13b of the bellows 13. The butt section 10 is then reamed out with a reamer of constant diameter to receive the bushing 14. The tip section is reamed out with a taper reamer to receive the bushing 15. The ends of the two sections 10, 11 are then radiused to remove sharp corners left by the cutting and reaming operations.

The assembly consisting of the bellows 13, the sleeve 16, and the bushing 14, 15 is now secured into the ends of the sections 10, 11 by means of further thin film applications of an epoxy resin adhesive.

The thin films of epoxy resin adhesive which secures the various parts of the joint together allow slight, but heavily damped, axial movement between the tip section 11 and the butt section 10 of the cue. The bellows 13 provides a restoring force which resists movement of the tip section 11 towards the butt section 10.

The tube has very similar characteristics to a wooden cue of good quality. The controlled resilience of the joint means simulates the heavily damped resilience of a wooden cue enabling the user to accurately execute shots where it is required to spin the cue ball considerably. With the average metal cue full control of spin is extremely difficult, if not impossible, to obtain. The cue of the present invention, however, retains the advantage of other metal cues in that it is possible to produce the cues consistently in large numbers so that even an experienced player will be unable to detect any difference between two cues of a batch.

Having thus described my invention what I claim as new and desire to secure by Letters Patent is:

1. A billiard cue comprising a pair of tubular metal sections joined together in end-to-end relationship by resilient joint means incorporating a metal bellows having an intermediate convoluted portion interposed between the ends of said sections and an integrally connected pair of plane tubular end portions, said bellows adapted to permit slight relative longitudinal movement of said sections.

2. A cue as claimed in claim 1 in which said resilient joint means further incorporates a metal sleeve within said bellows and attached to both of said plane tubular end portions by means of a flexible adhesive.

3. A cue as claimed in claim 2 in which the plane tubular end portions have secured thereto by means of a flexible adhesive a pair of surrounding bushings which are secured by means of a flexible adhesive into the ends of said sections.

References Cited

UNITED STATES PATENTS 3,381,959   5/1968   Fiell _____ 273—68

FOREIGN PATENTS 1,054,868   10/1953   France.

RICHARD C. PINKHAM, Primary Examiner
T. BROWN, Assistant Examiner